United States Patent
Kabat et al.

(10) Patent No.: US 6,679,231 B2
(45) Date of Patent: Jan. 20, 2004

(54) FUEL INJECTOR ASSEMBLY FOR DRY FUELS

(75) Inventors: Daniel Michael Kabat, Oxford, MI (US); Timothy J Potter, Dearborn, MI (US); William Chris Vassell, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 09/682,979

(22) Filed: Nov. 5, 2001

(65) Prior Publication Data

US 2003/0084882 A1 May 8, 2003

(51) Int. Cl.$^7$ ................................................ F02B 43/00
(52) U.S. Cl. .................. 123/527; 123/190; 251/129.14; 239/585.1
(58) Field of Search ................................. 123/527, 190; 251/129.14, 129.15; 239/585.1, 585.4, 585.5

(56) References Cited

U.S. PATENT DOCUMENTS

| | | | |
|---|---|---|---|
| 4,556,361 A | * | 12/1985 | Bartlett et al. ........... 414/744.8 |
| 5,237,967 A | | 8/1993 | Willermet et al. |
| 5,249,554 A | | 10/1993 | Tamor et al. |
| 5,294,282 A | * | 3/1994 | Rock et al. .................. 156/516 |
| 5,309,874 A | | 5/1994 | Willermet et al. |
| 5,752,689 A | * | 5/1998 | Barkhimer et al. ..... 251/129.15 |
| 5,783,261 A | | 7/1998 | Potter et al. |
| 6,047,671 A | | 4/2000 | Tubb et al. |
| 6,145,763 A | | 11/2000 | Fleming et al. |

* cited by examiner

*Primary Examiner*—John Kwon

(57) ABSTRACT

A fuel injector system according to the present invention has a housing (52) having a valve assembly (56) disposed therein. A solenoid (54) is also disposed within the housing (52). A valve assembly (56) is disposed between an inlet port (82) and an outlet port (80). The valve assembly has a valve seat (74) having an opening (84) therein. A drive pin (108) extends at least partially through valve opening (84). A stop (78) has a spring (86) thereon. A valve element (76) is urged against the valve opening (84) by spring (86). The drive pin is at least partially coated with a lubricating coating. In the preferred embodiment at least a concave surface (144) of drive pin (108) is coated. In addition, a concave surface (140) of stop (108) is also coated. In addition, spring seat (79) may also be coated with a lubricating coating as well.

10 Claims, 2 Drawing Sheets

FUEL INJECTOR ASSEMBLY FOR DRY FUELS

BACKGROUND OF INVENTION

1. Technical Field

The present invention relates to a gaseous fuel injector assembly and, more particularly, to a solenoid valve assembly for a fuel injector particularly suited for use in a dry gaseous-fueled vehicle such as a hydrogen-powered vehicle.

2. Background

Solenoid-actuated valve assemblies, generally known as "solenoid valve assemblies", are widely used in a multitude of applications including fuel injection systems. The typical solenoid valve assembly of interest herein includes a housing assembly in which is disposed a solenoid and a valve assembly in axial alignment with one another. The solenoid includes a coil, a stationary pole piece or stator, and a movable plunger including an armature and a drive pin. The plunger extends axially through a bore in the pole piece such that, upon energization or deenergization of the coil, the plunger moves axially to open and close a valve element of the valve assembly. A great many solenoid valve assembly designs are available, with the design details being tailored to meet the needs of a particular application.

One example of a fuel injector assembly is shown in U.S. Pat. No. 5,752,689, which is hereby incorporated by reference. Typically, such valves are used in with compressed natural gas systems which have at least some compressor lubricant. A hydrogen gas source, however, does not have any lubricant therein. Therefore, one problem with the embodiments in the "689 patent is that when used with dry fuels such as hydrogen, excessive wear is present in the moving portions of the injector.

It would therefore be desirable to provide a fuel injector assembly system that allows use with dry fuels such as hydrogen.

SUMMARY OF INVENTION

The present invention is a solenoid valve assembly that exhibits increased durability when compared to similar prior solenoid valve assemblies.

A fuel injector system according to the present invention has a housing having a valve assembly disposed therein. A solenoid is also disposed within the housing. A valve assembly is disposed between an inlet port and an outlet port. The valve assembly has a valve seat having an opening therein. A drive pin extends at least partially through valve opening. A stop has a spring thereon. A valve element is urged against the valve opening by spring. The drive pin is at least partially coated with a lubricating coating. In the preferred embodiment at least a concave surface of drive pin is coated. In addition, a concave surface of stop may also be coated. In addition, a spring seat of stop may also be coated with a lubricating coating as well.

One advantage of the invention is that the life of the fuel injector for dry fuels is increased.

Other advantages and features of the present invention will become apparent when viewed in light of the detailed description of the preferred embodiment when taken in conjunction with the attached drawings and appended claims.

DETAILED DESCRIPTION

Figure 1:
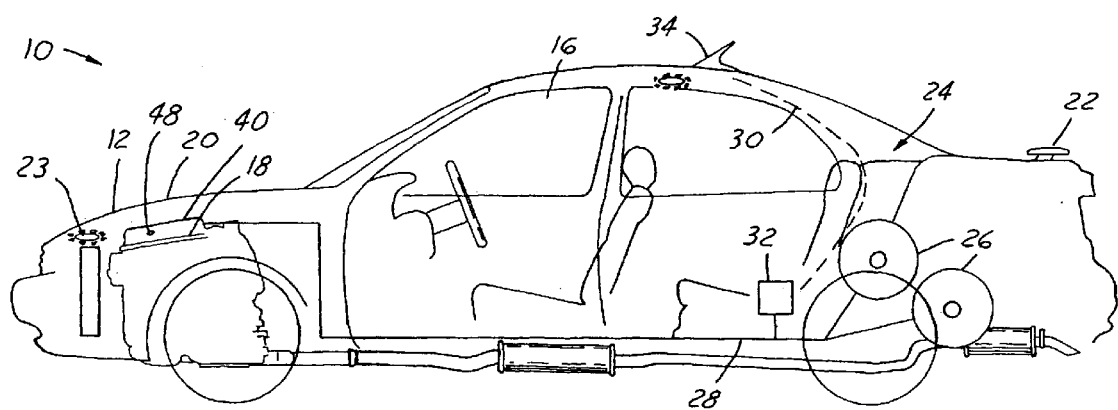
FIG. 1 schematically represents an internal combustion engine employing a gaseous fuel injection system according to the present invention.

In the following figures the same reference numerals are used to identify the same components. The following description is described with respect to a hydrogen powered vehicle. However, the present invention is applicable to other types of gaseous powered vehicles including liquefied natural gas (LNG) or other dry gaseous fuels. Further, the present invention is described with one example of a fuel injector. However, the teachings of the present invention may be applied to various configurations of fuel injectors.

Referring now to FIG. 1, an automotive vehicle 10 is illustrated having an engine compartment 12, a passenger compartment 14, and a trunk compartment 16. An engine 18 is positioned within the engine compartment 12. Engine 18 preferably operates using a compressed gaseous fuel such as hydrogen. Engine compartment 12 may also contain various other accessories for the automotive vehicle, which are not illustrated, and include such components as a radiator, battery, electrical distribution system, air conditioning, and a power steering pump. Air may be circulated throughout the engine compartment 12 and trunk compartment 16 through vents 20, 22 using a ventilation fan or fans 23, one of which is illustrated.

Trunk compartment 16 may have a gaseous fuel distribution system 24 therein for routing the gaseous fuel to engine 18. Distribution system 24 includes a storage tank or tanks 26, a fuel line 28, vent line 30 and a control circuit 32. Storage tanks 26 store compressed hydrogen fuel therein. Vent line 30 is coupled to a vent 34 such as a roof vent as illustrated.

Storage tanks 26 are coupled to engine 18 through fuel line 28 and a fuel rail or gas manifold 40. Gas manifold 40 has a plurality of fuel injector assemblies 48 positioned therein. In the preferred embodiment, one fuel injector assembly 48 is provided for each cylinder, although only one is illustrated in the drawing for simplicity.

Figures 2, 3:
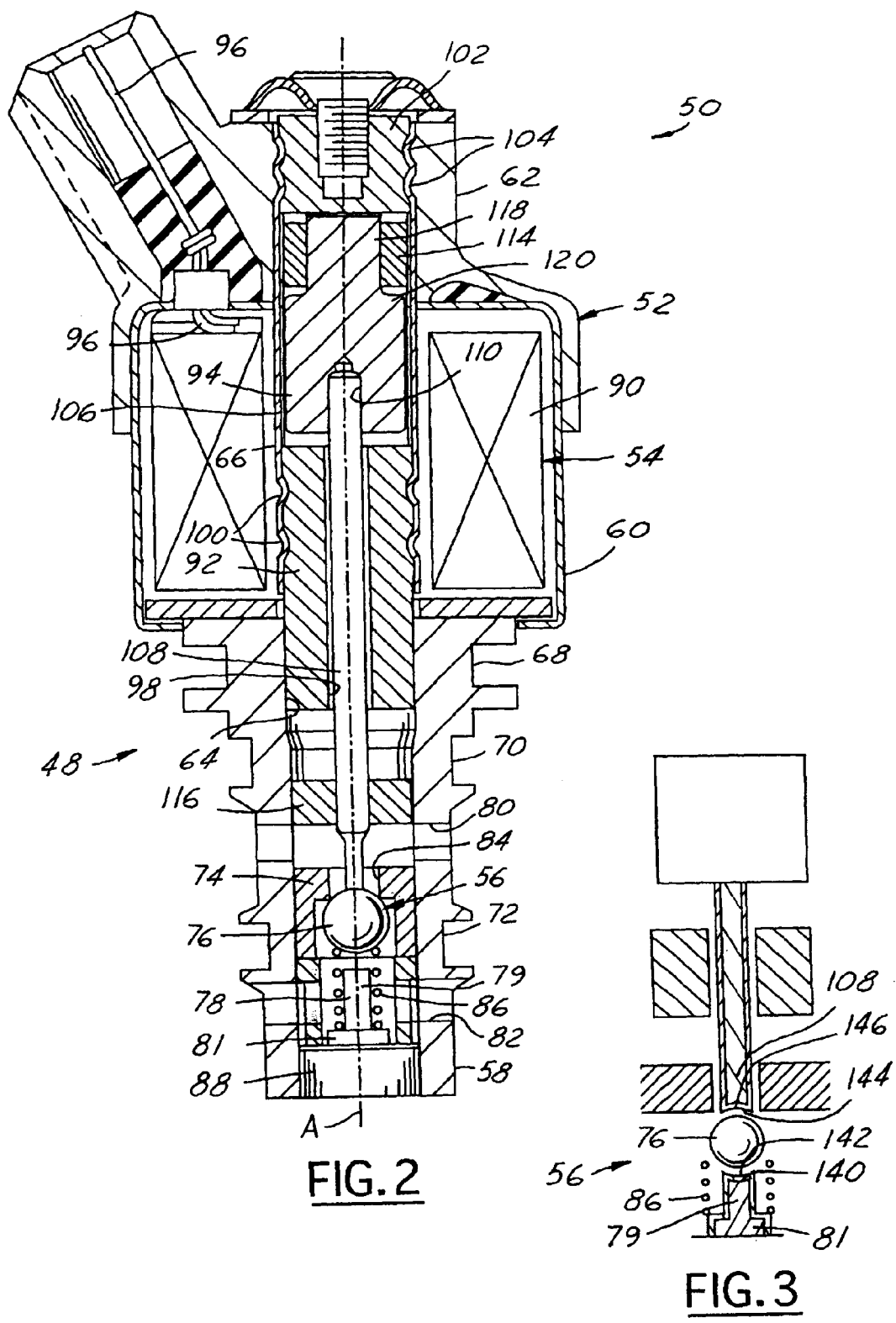
FIG. 2 is a sectional side elevation view of a solenoid valve assembly constructed in accordance with a preferred embodiment of the invention.
FIG. 3 is a cross-sectional view of the moving components of the fuel injection according to the present invention.

Referring now to FIG. 2, a fuel injector assembly 48 having a solenoid valve assembly 50 is illustrated having a construction in accordance with the present invention. The solenoid valve assembly 50 includes a cylindrical housing assembly 52 in which is disposed a solenoid 54 and a valve assembly 56 located axially in front of the solenoid (the terms "in front of", "behind" and the like as used herein are merely conventions and are not intended to require any particular direction of extension). The illustrated housing assembly 52 is formed in three sections including a front valve housing 58, an intermediate solenoid housing 60, and a rear end cap 62 all fixedly interconnected. A bore 64 extends axially through the entire housing assembly 52. A solenoid support tube 66 extends from the rear end of the cap 62 to the front end of the solenoid housing 60. The valve housing 58 of the illustrated embodiment is configured for mounting in a gas manifold and, for this purpose, has rear, intermediate, and front grooves 68, 70, and 72. Groove 68 cooperates with a clamp plate (not shown) that clamps the solenoid valve assembly 50 to the gas manifold 40 shown in FIG. 1. Grooves 70 and 72 receive O rings (not shown) for sealingly mounting the solenoid valve assembly 50 in a corresponding bore of the gas manifold 40.

The configuration of the valve assembly 56 may vary significantly depending upon the purpose of the solenoid valve assembly 50. The illustrated solenoid valve assembly 50 comprises a two-way/two-position valve assembly usable as a gaseous fuel injector. The valve assembly 56 includes a seat 74, a valve element 76, and a stop 78, all of which are disposed between an inlet port 82 formed radially through the valve housing 58 and an outlet port 80 formed radially through the valve housing 58 axially in front of the inlet port 82. The seat 74 is formed from a metallic element preferably taking the form of an inverted U and fixedly mounted in the bore 64 between the inlet port 82 and the outlet port 80 (the radial leg of the seat 74 is preferably formed from a separate spacer which permits control of valve travel). Seat 74 may be formed straight across the injector assembly 48 rather than being U-shaped. A hole 84 is formed axially through the radial leg of the seat 74 to permit passage of the armature drive pin 108 (detailed below) and fuel therethrough. The valve element 76 includes a ball that has a diameter greater than the diameter of the hole 84. In the deenergized state of the solenoid 54, the valve element or valve ball 76 is biased into engagement with the seat 74 by a return spring 86 to block the hole 84. The stop 78 functions to limit movement of the valve ball 76 away from the valve seat 74. Stop 78 has a spring seat 79 and a base 81. Sprint seat 79 serves as a cylindrical guide for the spring 86 and takes the form of a rearwardly-extending axial pin mounted on a plug 88 fixedly engaging the front end of the valve housing 58.

The solenoid 54 is designed to be relatively simple to fabricate and to assemble and yet to provide a high degree of stability, uniformity, and durability. The solenoid 54 includes the cylindrical support tube 66, a coil 90, a pole piece 92, and a plunger 94. The tube 66, which is constructed of a non-magnetic material such as stainless steel or an aluminum alloy, forms the body or base of the solenoid 54. The tube 66 is of essentially constant diameter and extends axially from the rear end of the housing assembly 52 towards the front end. In the illustrated embodiment, the tube 66 stops just short of the rear end of the valve housing 58.

The coil 90 coaxially surrounds the tube 66 and is encased by the solenoid housing 60. Electrical supply conductors 96 extend through a suitable opening in the housing assembly 52 and into electrical connection with the coil 90.

The pole piece 92 comprises an elongated, cylindrical body of magnetic material that is mounted in the forward portion of the tube 66 in magnetic registry with the forward portion of the coil 90 so as to extend forwardly from both the tube 66 and the coil 90. The pole piece 92 has a central axial bore or passage 98 extending therethrough of essentially constant diameter. A pair of sharpened external annular grooves 100 are formed in the rear portion of the pole piece 92 to enable the pole piece 92 to be fixed and sealed to the tube 66 by annular swaging of the tube 66 into the grooves 100. The front portion of the pole piece 92 extends forwardly into and is axially secured in a counterbored portion of the housing bore 64. An end plug 102 of non-magnetic material is locked and sealed in the rear end of the tube 66 by annular swaging of the wall of the tube 66 into a pair of sharp-edged external annular grooves 104 on the end plug 102. The front end surface of the end plug 102 is imperforate to permit it to act as a stop for the plunger 94.

The plunger 94 includes a rear armature 106 of magnetic material and a front drive pin 108. Drive pin 108 is fixedly attached to the front end of the armature 106, e.g., by being press fitted into an axial hole 110 formed in the armature 106. The drive pin 108 extends forwardly from the armature 106, through the axial bore or passage 98 in the pole piece 92, and to a front end 112 terminating axially between the pole piece 92 and the valve ball 76 so as to be capable of engaging the valve ball 76 and of driving the valve ball 76 away from the seat 74. The diameter of the drive pin 108 is smaller than the diameter of the bore 98 in the pole piece so that an annular clearance is formed therebetween. This annular clearance is of uniform thickness and extends the entire axial length of the pole piece 82. The front end 112 of the drive pin 108 is of a reduced diameter to provide radial clearance between the drive pin 108 and the edge of the hole 84 in the valve seat 74 of sufficient diameter to permit free fluid flow through the hole 84 when the valve assembly 56 is open.

The plunger 94 is slidably guided at its front and rear ends so as to assure that the plunger 94 remains coaxial with the valve assembly 56 and the pole piece 92, i.e., that all three elements retain the same axis A in FIG. 2. Guidance is achieved by the provision of two separate guides, the first or armature guide 114 of which is located above or behind the pole piece 92, the second or drive pin guide 116 of which is located beneath or in front of the pole piece 92, and both of which slidably engage the plunger 94.

The first or armature guide 114 surrounds and is slidably engaged by the armature 106. This guide 114 preferably takes the form of a bushing that is fixedly mounted in the tube 66 near the rear end of the tube so as not to require any modification to the design of the tube 66 or the plug 102. The guide bushing 114 is formed from a relatively durable non-magnetic material, preferably brass or plastic, and may if desired be impregnated with a lubricant. The guide bushing 114 surrounds the rear end portion of the armature 106, with the armature 106 being stepped such that the rear end portion 118 is of a reduced diameter as compared to the front end portion 120 to accommodate the guide bushing 114 without having to machine a recess into the side of the tube 66 to accommodate insertion of the guide bushing 114. The guide bushing 114 is relatively long and wide so as to distribute loads over a relatively large area and hence to minimize stress on the guide bushing 114 and the armature 106. The forward or larger diameter end portion 120 of the armature 106 is nearly as wide as the inner diameter of the tube 66 but does not contact the wall of the tube 66. Hence, while the plunger 94 is slidably guided by contact between the rear end 118 of the armature 106 and the inner surface of the guide bushing 114, it does not contact either the tube 66 or the pole piece 92.

The second or drive pin guide 116 also preferably takes the form of a bushing or guide ring which also is preferably made of brass or another suitable non-magnetic metal. The guide bushing 116 is fixedly mounted in the valve housing 58 beneath the counterbore at a location just above the outlet port 80 so as to surround the drive pin 108 and to be slidably engaged by the drive pin.

The operation of the solenoid valve assembly 50 should be for the most part self-evident from the foregoing and hence will be described only briefly. When the coil 90 is deenergized, the valve assembly 56 assumes a closed state in which the valve ball 76 is driven onto the seat 74 under the action of the return spring 86 and the armature 106 is driven rearwardly to or near its rearward-most position in which it contacts the plug 102. Energization of the coil 90 causes the plunger 94 to move forwardly or downwardly as illustrated in FIG. 2 to drive the valve ball 76 away from the seat 74 and into contact with the stop 78, thereby opening the valve. A small axial gap (airgap) still remains between the armature 106 and the pole piece 92 at the end of this motion so that the pole piece 92 is not damaged. Coaxialarity between the plunger 94, the valve assembly 56, and the pole piece 92 is assured by sliding engagement between the armature 106 and the first or armature guide bushing 114 and between the drive pin 108 and the second or drive pin guide bushing 116.

Several operational benefits result from the interaction of the first and second guide bushings 114 and 116. By maintaining coaxialarity between the armature 94, the pole piece 92, and the valve ball 76, the guide bushings 114 and 116 not only assure the desired optimal interaction between the tip of the drive pin 108 and the valve ball 76, but also assure that a uniform air gap between the drive pin 108 and the pole piece 92 is retained, thereby assuring a uniform thrust on the armature 106 by the coil 90. This improved guidance and improved uniformity of thrust assure reduced valve-to-valve and cycle-to-cycle flow variations across the valve assembly 56. Moreover, because degraded guidance, which would otherwise occur upon pole piece wear is avoided, this enhanced cycle-to-cycle flow uniformity still remains after many operational cycles. The improved guidance provided by the first guide bushing 114 also produces reduced opening and closing variability during valve operation, thereby further enhancing operational consistency. Also, valve bounce, i.e., movement of the drive pin 108 and the valve ball 76 forwardly upon valve closure, is reduced due to drive pin damping caused by sliding contact between the armature 106 and the guide bushing 114, thereby increasing operational predictability and reducing valve wear. Valve wear is reduced further by the absence of contact between the plunger 94 and the pole piece 92. The major cause of valve malfunction, i.e., loss of flow and irregular opening/closing is due to loss of the airgap. The loss of airgap is due to the plunger contacting the pole piece because seat and drive pin shorten due to wear. A coating is accordance with the present invention remedies this problem. The aggregate effect is improved operational predictability with a dramatically increased valve life.

Referring now to FIG. 3, a cross-sectional view of valve assembly 56 is illustrated. Valve assembly 56 has certain components therein coated with a lubricating coating to decrease wear. The coating decreases wear which is particularly suitable used with dry fuels such as hydrogen. The coating is disposed on stop 78 and drive pin 108. The coating is a lubricating coating and is preferably formed of silicon doped amorphous hydrogenated carbon (Si:AHC). As will be further described below, the coating has a high temperature capability of about 450° C. and has a thickness of between about 2–4 $\mu$m. The coefficient of friction of the coating is between 0.10 and 0.15 and has a hardness range of 12 to 16 GPa. One tested embodiment was tested for 800 hours of operation which corresponds to 45,000 miles of vehicle operation without degradation.

Stop 78 has spring seat 79 with a concave surface 140. The concave surface 140 is sized to correspond to the diameter of valve ball 76. Preferably, the arc of concave surface 140 has the same as the diameter of valve ball 76. At least a portion of stop 78 is coated. At minimum, concave surface 140 has a coating 142. Coating 142 may also be applied to spring seat 79 and base 81.

Drive pin 108 has a concave surface 144 that is used to contact drive ball 76. Concave surface 144 is formed in a similar manner to that of concave surface 140 in that the diameter of the arc is preferably the same diameter as ball 76. A coating 146 is disposed on drive pin 108. At minimum, coating 146 preferably covers concave surface 144. Also, drive pin 108 is also coated with coating 146 on the axially extending sidewalls thereof. Coating 146 is the same as coating 142.

Suitable processes for forming a coating according to the present invention are found in U.S. Pat. Nos. 5,237,967, 5,309,874, 5,249,554, and 5,783,261, each of which is incorporated by reference herein. Preferably, where the components of the fuel injector, hereinafter substrate, is of a relatively soft material, such as aluminum, an interlayer may be used. Such an interlayer may, for example, be relatively thick (exceeding >1 micron). The provision of a relatively thick (exceeding >1 micron) silicon interlayer serves to improve adhesion and durability of low-wear coatings on mechanical components which are subject to sliding contact, rolling contact, or both. For example, a 3 micron silicon interlayer results in a system having a performance akin to that exhibited by a carbonaceous film when applied directly to steel. Depending on the substrate material and component operating conditions, the interlayer may have a thickness between 200 angstroms and 30 microns.

As noted earlier, the provision of hard, wear resistant coatings, such as hydrogenated carbon films, is often accompanied by intrinsic compressive stress. Where a thick silicon interlayer is interposed, for example, adhesion is improved, and a mechanical support layer which distributes contact stress is provided, thereby improving film durability of a given thickness.

Hydrogenated carbon films are of interest because of their attributes of high hardness and wear resistance. Such films consist of isolated $SP^2$ carboncarbon (C—C) bonded (graphitic) clusters, the size of which is no larger than 30–40 Angstroms. These clusters may in turn be linked by $SP^3$ C—C bonds to form a rigid three dimensional structure. The film imparts the characteristics of low friction and wear resistance to the component.

Noteworthy of the AHC coating is the absence of a crystalline structure which would generally typify synthetic diamond coatings. The absence of crystal structure is confirmed by x-ray defraction techniques.

Pure AHC will have high internal stress and be adversely effected by water molecules in the feed. Research has shown that incorporating 10 to 20 percent silicon atoms into the film greatly reduces both problems. Adding some tetramethylsilane or diethylsilane to the gas feed to the RF reactor will provide the required silicon doping to the film. Cosputtering silicon as the carbon deposition takes place can also provide silicon in the film, but that process is far more problematic. The films may also have hydrogen incorporated into the film, but good results have been obtained with 35–50 atomic percent hydrogen in the coatings.

Such films can be deposited by various techniques, including direct current (DC), radio frequency (RF) plasma-assisted chemical vapor deposition (CVD), ion beam deposition, and arc discharge techniques.

A preferred way of depositing the disclosed coatings is in a capacitively coupled RF-driven plasma reactor. Good results have been obtained in a parallel plate RF-driven plasma reactor where a table upon which a desired component to be coated is supported and a target (if one is used) is water-cooled. The entire assembly generally is enclosed in a vacuum chamber. Advantageously, the substrate may be cleaned and degreased by ultrasonic cleaning in a detergent (such as Alconox), a solvent (such as acetone), and an alcohol (such as isopropanol).

The degreased component is then inserted into the deposition reactor within a vacuum chamber, which is then evacuated to a system base pressure which is $10^{-6}$ Torr or less in order to minimize oxygen from ambient water vapor.

The substrate is further cleaned by a sputtering technique using an inert gas such as argon by ion bombardment. This entails admitting argon gas to a pressure in the range of 1 to 100 milli-torr and directing all RF-power to the substrate. This generates a large negative potential relative to the plasma, which draws ions from the plasma and accelerates them to the substrate. The preferred deposition voltage is 500 volts, but 200 to 1000 volts will provide coatings with reasonable qualities. Chemically inert argon ions dislodge other atoms, thereby cleaning the substrate.

The deposition of an hydrogenated carbon film is commenced by starting the flow of hydrocarbon vapor, while sputter etching is still in progress. Hydrocarbon ions are accelerated to the substrate, thereby forming the amorphous hydrogenated carbon film. Optimum film properties are obtained when ion kinetic energy is in the range of 50 to 200 electron volts per carbon atom in the impinging ion. The hydrocarbon source is preferably methane, but possible substituents include ethane, ethylene, acetylene, benzene, butane, propane, pentene, hexane, toluene, and xylene. The flow of inert gas is then stopped. As the gas mixture gradually changes from etching to deposition, a mixed carbon-substrate or carbon-interlayer transition layer assures good adhesion of the hydrogenated carbon film. Deposition is then continued until a desired film thickness is attained.

Most metals of which the injector components would be made may require an interlayer may be sputter-deposited before carbon film deposition by directing most of the RF-power to a sputtered target (another electrode). This shift is performed continuously without shutting off the plasma, so that all surfaces remain very clean at all times. The target then takes on a large potential relative to the plasma and it becomes sputter-etched with dislodged atoms depositing on the substrate.

For many applications, the interlayer may be formed from chrome. It should be realized, however, that in some environments, the deployment of a tungsten, titanium, silicon, aluminum, or germanium interlayer may be made with good results. In general, the selection of a suitable interlayer tends to be guided by availability of an interlayer material which tends not to be water soluble in liquid form and exhibits stability as a carbide.

In operation, when methane is used as the carbon source, the RF technique results in a deposition rate of about 1 micron per hour where the applied negative bias voltage is 500 volts. Microwave techniques under similar conditions are faster, and enable a deposition layer to be formed of about 2 microns per hour. If higher molecular weight precursors such as pentene, butane, and benzene are used as the carbon source, even faster deposition rates are possible.

The films prepared by RF plasma techniques which use a hydrocarbon gas (e.g. methane) as the source of carbon may contain hydrogen in concentrations as high as 60 atomic percent. Hydrogen is linked to carbon atoms as $CH_1$, $CH_2$, and $CH_3$ bonds.

While particular embodiments of the invention have been shown and described, numerous variations and alternate embodiments will occur to those skilled in the art. Accordingly, it is intended that the invention be limited only in terms of the appended claims.

What is claimed is:

1. A fuel injector system comprising:

a housing;

a solenoid having a drive pin operatively coupled thereto, said drive pin at least partially coated with a lubricating coating thereon;

an inlet port;

an outlet port; and a valve assembly disposed between said inlet poll and said outlet port, said valve assembly comprising a valve seat having an opening therein, said drive pin extending at least partially through said valve opening, a stop having a spring thereon, and a valve element urged against said valve opening by the spring; and wherein said drive pin has a concave surface operatively contacting said valve element, said concave surface having a coating thereon.

2. A fuel injector system as recited in claim 1 wherein said coating is composed of amorphous hydrogenated carbon.

3. A fuel injector system as recited in claim 1 wherein stop has said spring seat having a lubricating coating thereon.

4. A fuel injector system comprising:

a housing;

a solenoid having a drive pin operatively coupled thereto, said drive pin at least partially coated with a lubricating coating thereon;

an inlet port;

an outlet port; and a valve assembly disposed between said inlet port and said outlet port, said valve assembly comprising a valve seat having an opening therein, said drive pin extending at least partially through said valve opening, a stop having a spring thereon, and a valve element urged against said valve opening by the spring; and wherein said stop has a concave surface, said concave surface having a coating thereon.

5. An automotive vehicle comprising:

a gaseous fuel source;

an engine having a manifold coupled to the gaseous fuel source;

a fuel injector having a housing;

a solenoid having a drive pin operatively coupled thereto, said drive pin at least partially coated with a lubricating coating thereon;

an inlet port;

an outlet port; and a valve assembly disposed between said inlet port and said outlet port, said valve assembly comprising a valve seat having an opening therein, said drive pin extending at least partially through said valve opening, a stop having a spring thereon, and a valve element urged against said valve opening by the spring, said stop at least partially coated with the lubricating coating; and wherein said drive pin has a concave surface operatively contacting said valve element, said concave surface having a coating thereon.

6. A fuel injector system as recited in claim 2 wherein said valve element comprises a ball for engaging the concave surface of the drive pin.

7. An automotive vehicle as recited in claim 5 wherein said gaseous fuel source comprises hydrogen.

8. An automotive vehicle as recited in claim 5 wherein said coating is composed of amorphous hydrogenated carbon.

9. An automotive vehicle comprising:

a gaseous fuel source;

an engine having a manifold coupled to the gaseous fuel source;

a fuel injector having a housing;

a solenoid having a drive pin operatively coupled thereto, said drive pin at least partially coated with a lubricating coating thereon;

an inlet port;

an outlet port; and a valve assembly disposed between said inlet port and said outlet port, said valve assembly comprising a valve seat having an opening therein, said drive pin extending at least partially through said valve opening, a stop having a spring thereon, and a valve element urged against said valve opening by the spring, said stop at least partially coated with the lubricating coating; and wherein said stop has a concave surface, said concave surface having a coating thereon.

10. An automotive vehicle as recited in claim 5 wherein said valve element comprises a ball for engaging the concave surface of the drive pin.

* * * * *